US005655086A

United States Patent [19]
Jury et al.

[11] Patent Number: 5,655,086
[45] Date of Patent: Aug. 5, 1997

[54] CONFIGURABLE ELECTRONIC PERFORMANCE SUPPORT SYSTEM FOR TOTAL QUALITY MANAGEMENT PROCESSES

[75] Inventors: Thomas W. Jury, Beavercreek, Ohio; Kent L. Gustafson, Crawford; Thomas C. Reeves, Athens, both of Ga.; Kevin C. Cole; George Huffman, both of Cincinnati, Ohio

[73] Assignee: NCR Corporation, Dayton, Ohio

[21] Appl. No.: 234,078

[22] Filed: Apr. 28, 1994

[51] Int. Cl.$^6$ .............................................. G06F 17/60
[52] U.S. Cl. ............................................................ 395/209
[58] Field of Search .................... 364/401 R, 419.19, 364/488, 468, 468.02, 468.03, 474.24, 474.22, 468.06, 468.05; 395/161, 155, 156, 159, 207, 208, 209

[56] References Cited

U.S. PATENT DOCUMENTS

| | | | |
|---|---|---|---|
| 4,964,060 | 10/1990 | Hartsog | 364/512 |
| 5,019,961 | 5/1991 | Addesso et al. | 395/161 |
| 5,134,560 | 7/1992 | Ferriter et al. | 395/159 |
| 5,310,349 | 5/1994 | Daniels et al. | 395/152 |
| 5,321,610 | 6/1994 | Breslin | 364/419.19 |
| 5,357,440 | 10/1994 | Talbott et al. | 364/488 |
| 5,420,978 | 5/1995 | Tozawa et al. | 395/161 |
| 5,428,729 | 6/1995 | Chang et al. | 395/161 |
| 5,487,144 | 1/1996 | Takahashi et al. | 395/161 |
| 5,493,642 | 2/1996 | Dunsmuir et al. | 395/161 |
| 5,500,800 | 3/1996 | Talbott | 364/488 |
| 5,530,861 | 6/1996 | Diamant et al. | 364/281.3 |

OTHER PUBLICATIONS

C.J. Ross, "Integrated Performance Support", *Coursevare*, Anderson Consulting, Jul. 1993, pp. 1–6.
K.L. Gustafson and T.C. Reeves, "IDioM: A Platform For A Course Development Expert System", *Educational Technology*, Mar. 1990, pp. 19–25.
Gloria Gery, "Electronic Performance Support Systems", Weingarten Publications, 1991, pp. 125–138.
Gary & Associates, "Consultants in Business Learning and Performance Support Systems", Oct. 29, 1993.
B. Raybould, "A Modular Approach To Electronic Performance Support", *Data Training*, Mar./Apr. 1992, pp. 24, 38.
B. Raybould, "An EPSS Case Study: Prime Computer, Ariel PSS Corporation", 1991, pp. 1–11.
Lewis J. Perelman, "Kanban to Kanbrain", *Forbes ASAP*, Jun. 6, 1994.
ComWare, "Esther Dyson Says Technologies and Time Ripe for Electronic Performance Support", Aug. 24, 1993.
Beverly Geber, "Help? The Rise of Performance Support Systems", *Training*, Dec. 1991, pp. 23–28.
ComWare, "Knowledge Support Services", 1991.

*Primary Examiner*—Donald E. McElheny, Jr.
*Attorney, Agent, or Firm*—George H. Gates

[57] ABSTRACT

A computer-implemented "Quality Information Products Process-Performance Support System" (QIPP-PSS) assists a user through the process of developing a training course or documentation. The QIPP-PSS typically operates on a computer having a monitor and a memory for storing electronic records related to the organization of projects. Each project is divided into one or more phases, each phase is divided into one or more work activities, and each work activity is divided into one or more job aids. The records for the projects, phases, work activities, and job aids include linkages to maintain these relationships. The job aids may comprise a boilerplate file providing templates for a project, a help file explaining how to use the template, linkages to a reference guide explaining the job aid, examples providing models of completed work activities, and project forms for documenting work in progress using the templates from the boilerplate file. The QIPP-PSS includes a graphical user interface comprised of a "project folder manager" that controls the interactions between the computer-implemented QIPP-PSS and the user, so that users can configure projects by adding, modifying, and deleting the project, phase, work activity, and job aid records.

20 Claims, 7 Drawing Sheets

CONFIGURABLE ELECTRONIC PERFORMANCE SUPPORT SYSTEM FOR TOTAL QUALITY MANAGEMENT PROCESSES

BACKGROUND OF THE INVENTION

1. Field of the Invention

The present invention generally relates to computer-implemented performance support systems, and in particular, to a configurable electronic performance support system for total quality management processes.

2. Description of Related Art

In order to focus on quality and customer needs, many businesses are implementing total quality management processes. A total quality management process typically includes a number of fundamental characteristics, including:

(1) the definition of a repeatable, predictable and manageable process, (2) the focus on customer requirements and the definition of quality in customer terms, and (3) the establishment of intra-process measurements and closed loop corrective actions to ensure quality.

An Electronic Performance Support System (EPSS) is an information technology that enables a user to have immediate access to the integrated information, guidance, advice, assistance, training and tools required to execute a process or specific tasks within a process. An EPSS can enhance the technology, organization, culture and management systems required to successfully implement a total quality management process.

The use of EPSS products is a recent phenomenon. Several prior art EPSS products have been developed to provide sales support, maintenance support, performance appraisal support, etc. However, prior art EPSS products are typically limited to a specific domain, that is, each supports a specific task, set of tasks, or process, and cannot be reconfigured for other processes. Prior art EPSS products also include proprietary tools such as forms or templates, and typically cannot be modified by users to fit their specific work environment. Thus, there is a need in the art for configurable EPSS products.

SUMMARY OF THE INVENTION

To overcome the limitations in the prior art described above, and to overcome other limitations that will become apparent upon reading and understanding the present specification, the present invention discloses a computer-implemented "Quality Information Products Process-Performance Support System" (QIPP-PSS) that assists a user through the process of developing a training course or documentation. The QIPP-PSS typically operates on a computer having a monitor and a memory for storing electronic records related to the organization of projects. Each project is divided into one or more phases, each phase is divided into one or more work activities, and each work activity is divided into one or more job aids. The records for the projects, phases, work activities, and job aids include linkages to maintain these relationships. The job aids may comprise a boilerplate file providing a template or pre-defined form for an application such as a word processor or spreadsheet, a standard Microsoft Windows help file explaining how to use the template, linkages to a reference guide explaining the job aid, examples providing models of completed work activities, and project forms for documenting work in progress using the templates from the boilerplate file. The QIPP-PSS includes a graphical user interface comprised of a "project folder manager" that controls the interactions between the computer-implemented QIPP-PSS and the user. The project folder manager selectively displays inter-related project, phase, work activity, and job aid records on a monitor, and allows users to configure projects by adding, modifying, and deleting the project, phase, work activity, and job aid records, thereby allowing the user to model any total quality management process.

An object of the present invention is to provide a total quality management (TQM) approach to the design, development and delivery of training and documentation. A feature of the present invention is a computer-implemented system that enables a user to have immediate access to the integrated information, guidance, advice, assistance, training and tools required to do a specific task or process.

Another object of the present invention is to help the user tailor information to meet audience requirements and to incorporate customer input early and often throughout the development cycle. A feature of the invention is that users can configure and define the system to model almost any total quality management process and to implement the system to fit any industry market and development environment.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Figure 1:
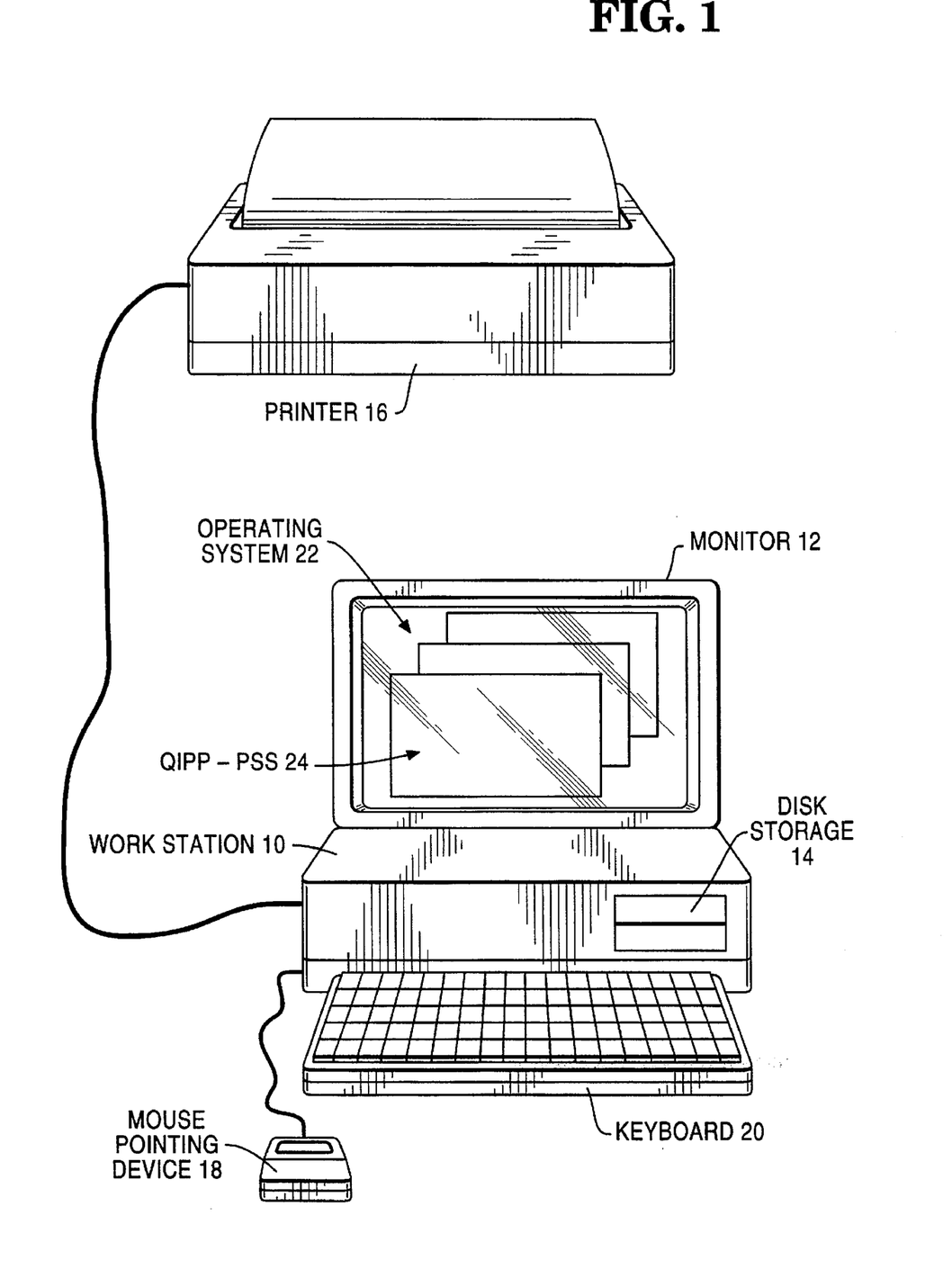
FIG. 1 illustrates one possible embodiment of the present invention.

FIG. 1 illustrates one possible embodiment of the present invention. The present invention comprises a computer-implemented "Quality Information Products Process-Performance Support System" (QIPP-PSS) that assists a user through the process of developing a training course or documentation. The QIPP-PSS typically operates on a computer 10 or network of computers 10. It is envisioned that attached to the computer 10 will be monitor 12, disk storage 14, and printer 16 peripherals. Also included in the preferred embodiment are input devices, for example, a mouse pointing device 18 and a keyboard 20. In addition, the computer 10 operates under the control of an operating system 22. The QIPP-PSS itself is a suite of computer programs 24 and databases or files operating under control of the operating system 22.

The QIPP-PSS 24 provides a total quality management (TQM) approach to the design, development and delivery of training and documentation. The QIPP-PSS 24 is an information technology enabling a user to have immediate access to the integrated information, guidance, advice, assistance, training and tools required to do a specific task or process. However, the QIPP-PSS 24 is not a set of policies, and it is not intended to be a lock-step procedure. The QIPP-PSS 24 provides a model that stresses attention on customer needs and seeks to continuously improve the process. The QIPP-PSS is designed to help the user tailor information to meet audience requirements and to incorporate customer input early and often throughout the development cycle. The goal is to achieve continuous improvement of not only information products, but of the process itself.

The QIPP-PSS 24 is a flexible tool that can be used to analyzed the information needs of specific audiences, and to make rational business decisions about how to meet those needs. The QIPP-PSS 24 is based on the philosophy of "if not, why not". For example, if a particular work activity in the process is not required for a given project, then the user can delete the activity. Ideally, the user simply documents the rationale for skipping the work activity, so that design decisions can be tracked after the project is completed.

The QIPP-PSS 24 is modifiable and configurable, thereby allowing the user to model almost any total quality management process and to implement the QIPP-PSS 24 to fit their own industry market and development environment. Users can configure and define the QIPP-PSS 24 by adding, modifying, or deleting any of the QIPP-PSS 24 components, i.e., phases, work activities, job aids, tools, help and examples.

Figure 2:
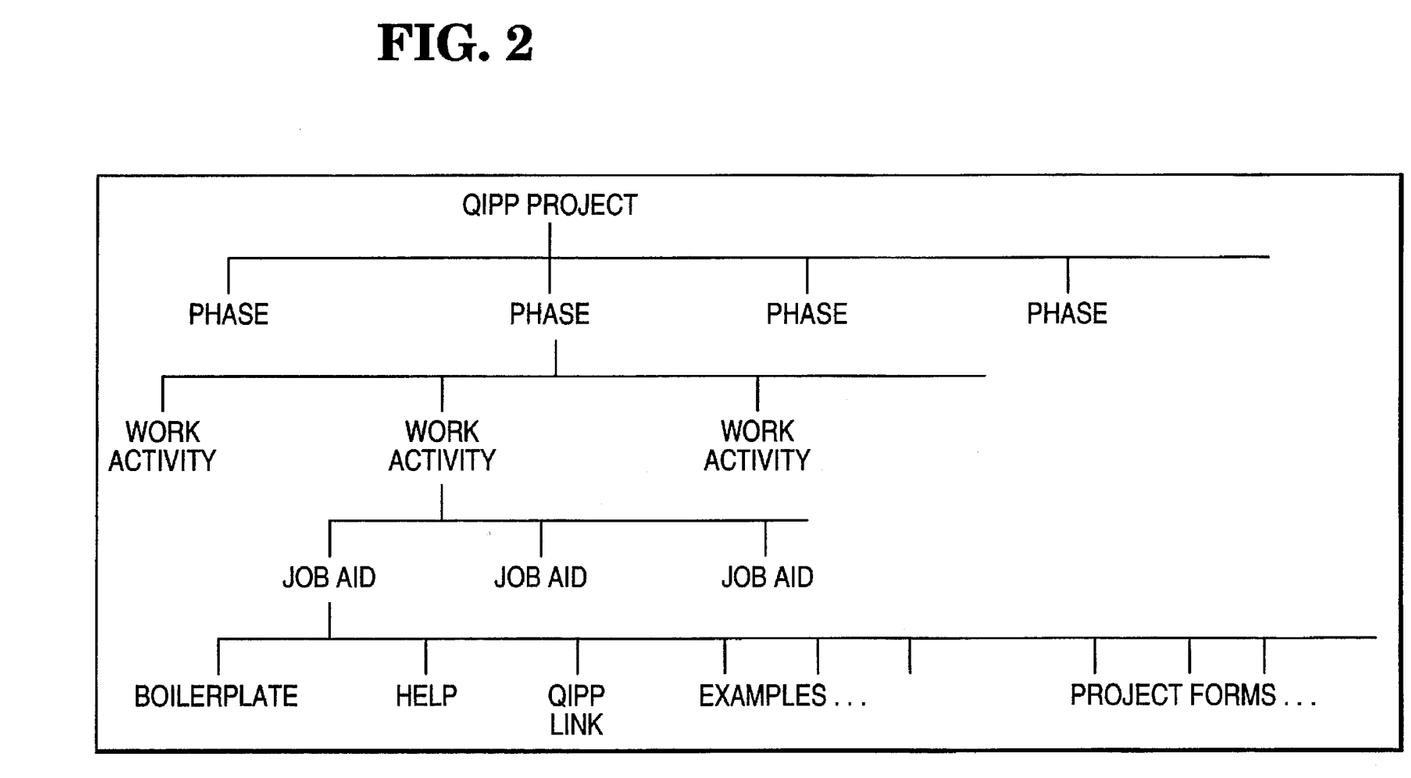
FIG. 2 is a tree description of the organization of projects within the present invention.

FIG. 2 is a tree description of the organization of records representing projects within the memory of the computer performing the QIPP-PSS 24. Each project in the QIPP-PSS 24 is divided into phases, which are divided into work activities, which contain one or more job aids. Each job aid comprises a template or boilerplate file, a help file (explaining how to use the template), QIPP links to a reference guide, examples (models of completed work activities), or project forms (for work in progress). The phases, work activities and job aids can be unique for each project. The records for the projects, phases, work activities, and job aids include linkages to maintain the relationships between the projects, phases, work activities, and job aids.

Figure 3:
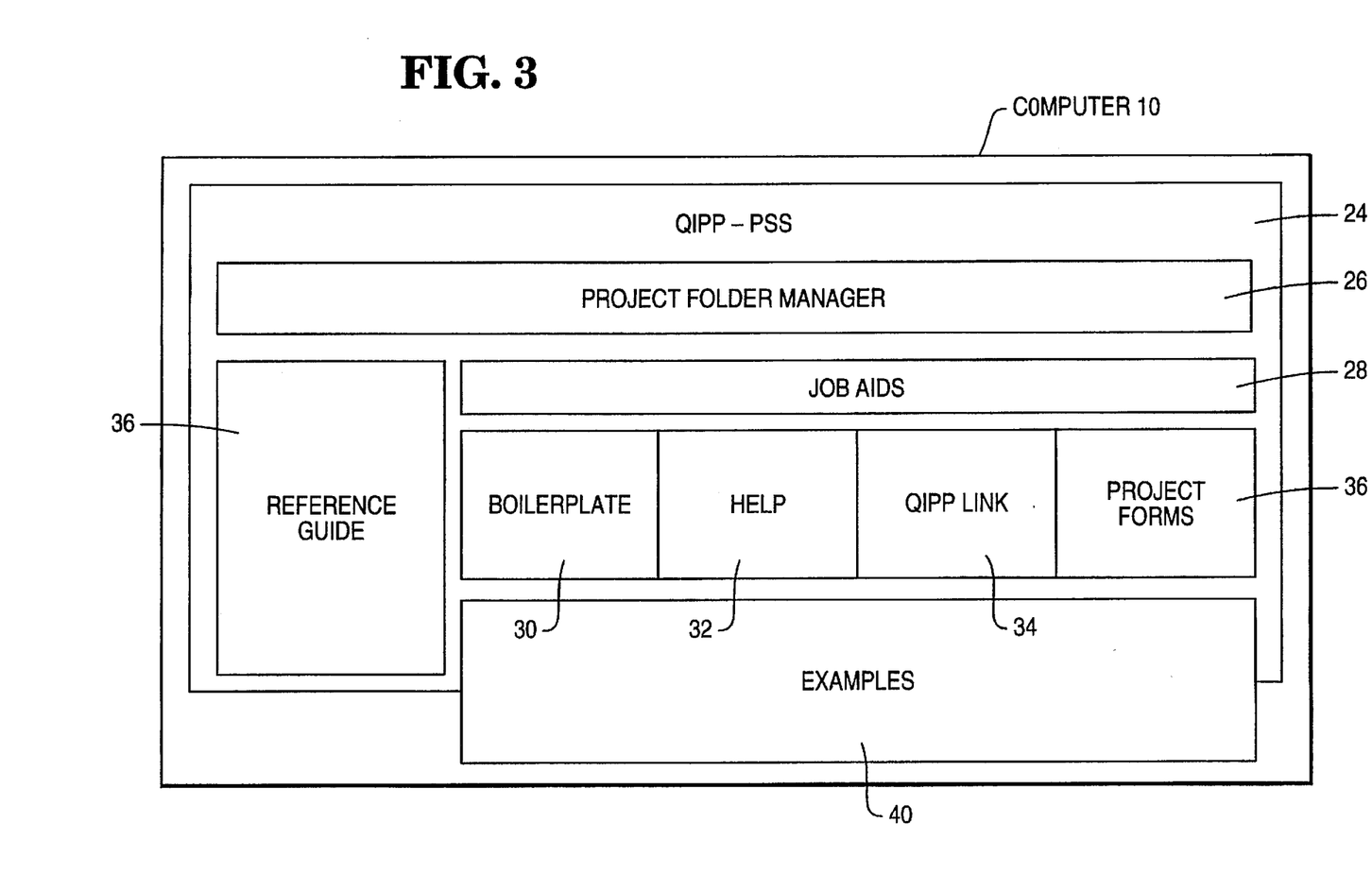
FIG. 3 is a block diagram illustrating the structure of the present invention.

FIG. 3 is a block diagram illustrating the structure of the QIPP-PSS 24. The QIPP-PSS 24 includes a graphical user interface for a "project folder manager" 26. The project folder manager 26 manages the interaction of the user with the component parts of the QIPP-PSS 24. More specifically, the project folder manager 26 organizes the projects into "folders." Each folder contains phases, work activities and job aids for the specific QIPP-PSS 24 project. The project manager folder 26 also controls access to the various job aids, such as boilerplate files 28, help files 30, QIPP links 32 to the reference guide 34, examples 38, and project forms 38.

The boilerplate files 28 include templates or predefined forms for standard applications such as word processors and spreadsheets. The user could copy these templates and forms into a new project form 38 when creating a new project. In addition, the boilerplate files could be "intelligent" programs themselves and provide advisory functions.

The help files 30 generally comprise standard Microsoft Windows help files that could include text, graphics, other multimedia elements, tutorials, demonstrations or interactive training programs. The help files typically include information to help the user understand the goals and methodology of the project, which information would typically be organized under the headings: What It Is; Why It Is Included; Where It Is In QIPP-PSS; How To Use It; References; and Credits.

The QIPP-PSS links 32 are pointers to the reference guide 34 that tie each job aid to a topic description of the work activity.

The reference guide 34 is a hyper-text document that identifies all the standard phases and work activities of the QIPP-PSS 24.

The example files 36 are completed samples of the documents supported by the job aids, which are available so that the user can review them as models for their work, for information on how to perform tasks, and for increasing the user's efficiency by permitting the "copy and paste" of appropriate existing materials.

The project forms 38 comprise the output of the work activities, wherein project forms 38 are completed or work-in-progress files that are based upon the boilerplate files or examples.

The job aids provided by the QIPP-PSS 24 also include those applications that can be used to perform the various work activities, e.g., spreadsheets, word processors, graphics editors, authoring tools, and decision support systems. The job aids typically comprise a WINDOWS or DOS application with an associated data file. The applications could be, for example, the Microsoft Word and Excel applications, and their associated data fries. Using the QIPP-PSS 24, users can create new job aids by associating new data files with these or other applications, and then integrating them into the QIPP-PSS 24.

Figure 4:
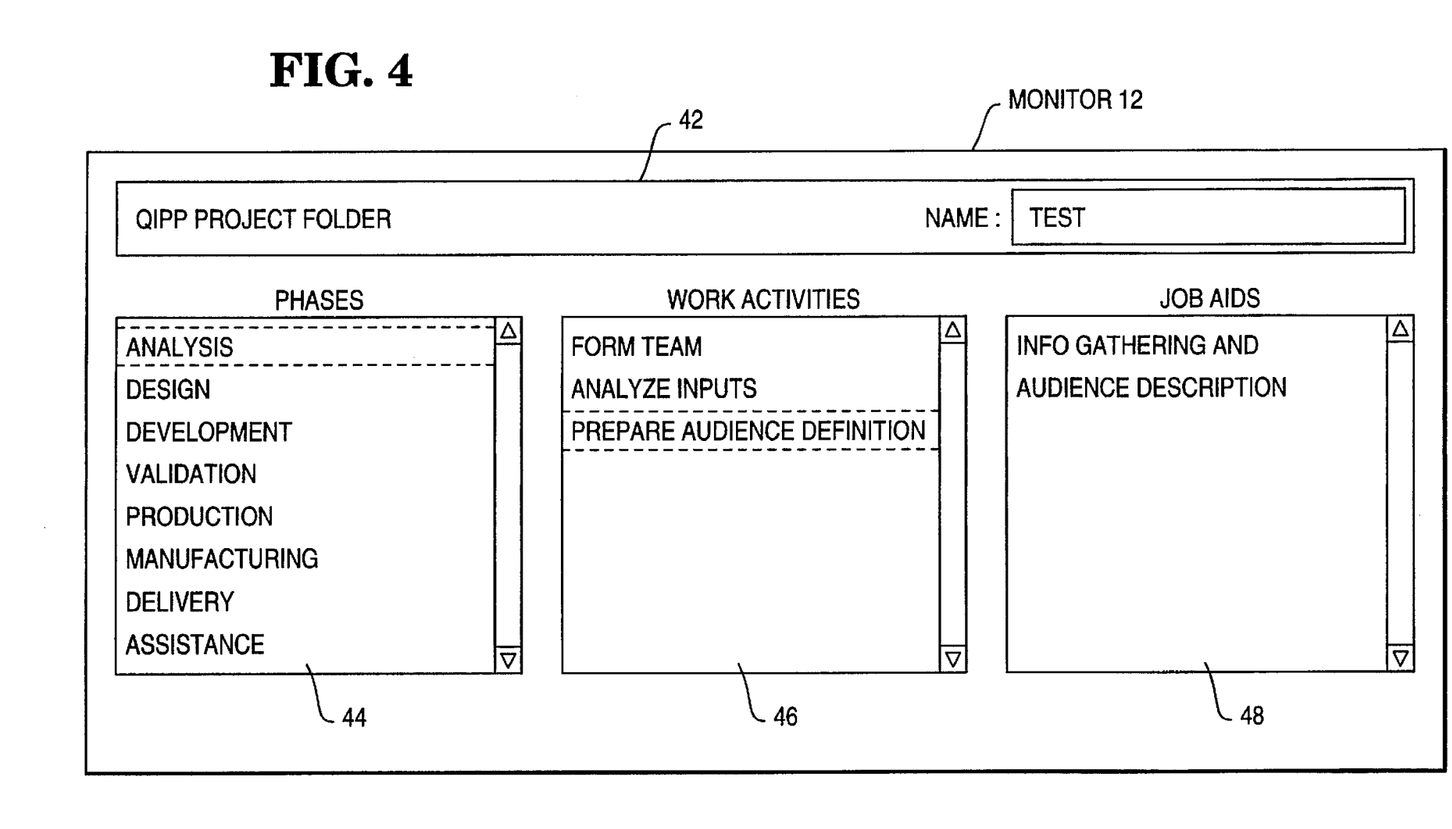
FIG. 4 is an illustration of one embodiment of the present invention relating to the presentation of the graphical user interface of the project folder manger.

FIG. 4 is an illustration of one embodiment of the graphical user interface of the project folder manger 26. In this embodiment, each project or folder is identified by a name 42 that is displayed in the upper right hand quadrant of the monitor 12. The remainder of the display on the monitor 12 is divided into three list boxes 44, 46, and 48 with scroll bars, wherein the left-most list box 44 lists the phases of the project, the center list box 46 lists the work activity for the currently selected phase in the left-most list box 44, and the right-most list box 48 lists the job aids for the for the currently selected work activity in the center list box 46. By selecting other phases, work activities, or job aids, the user can peruse the entire scope of the current project. Moreover, by selecting a job aid, the user can invoke an application and associated data file for that job aid, and add, modify or delete the data file or the contents thereof.

Figure 5A:
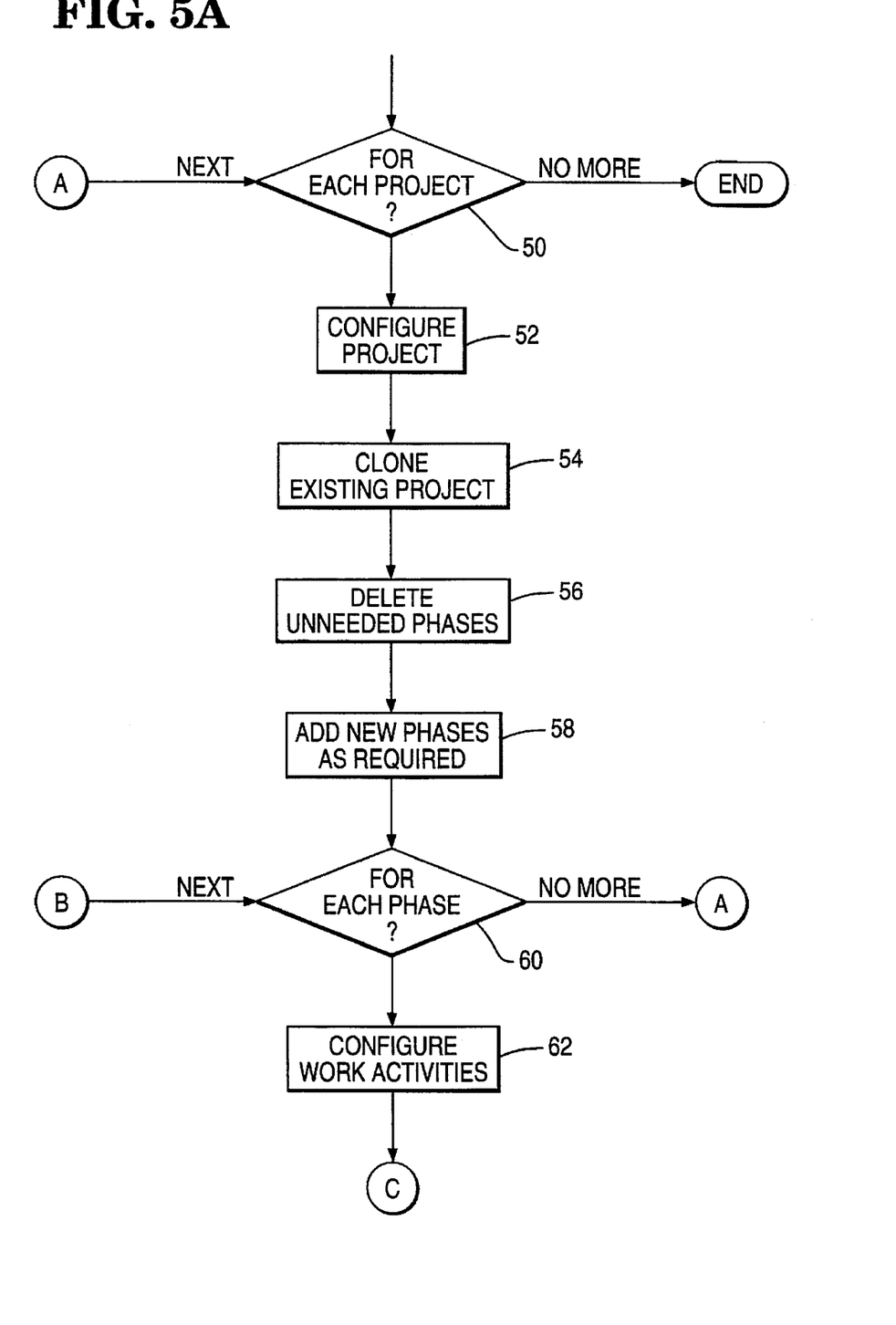
FIGS. 5A, 5B, and 5C together are a flow chart illustrating the steps performed in creating a project in the present invention.
Figure 5B:
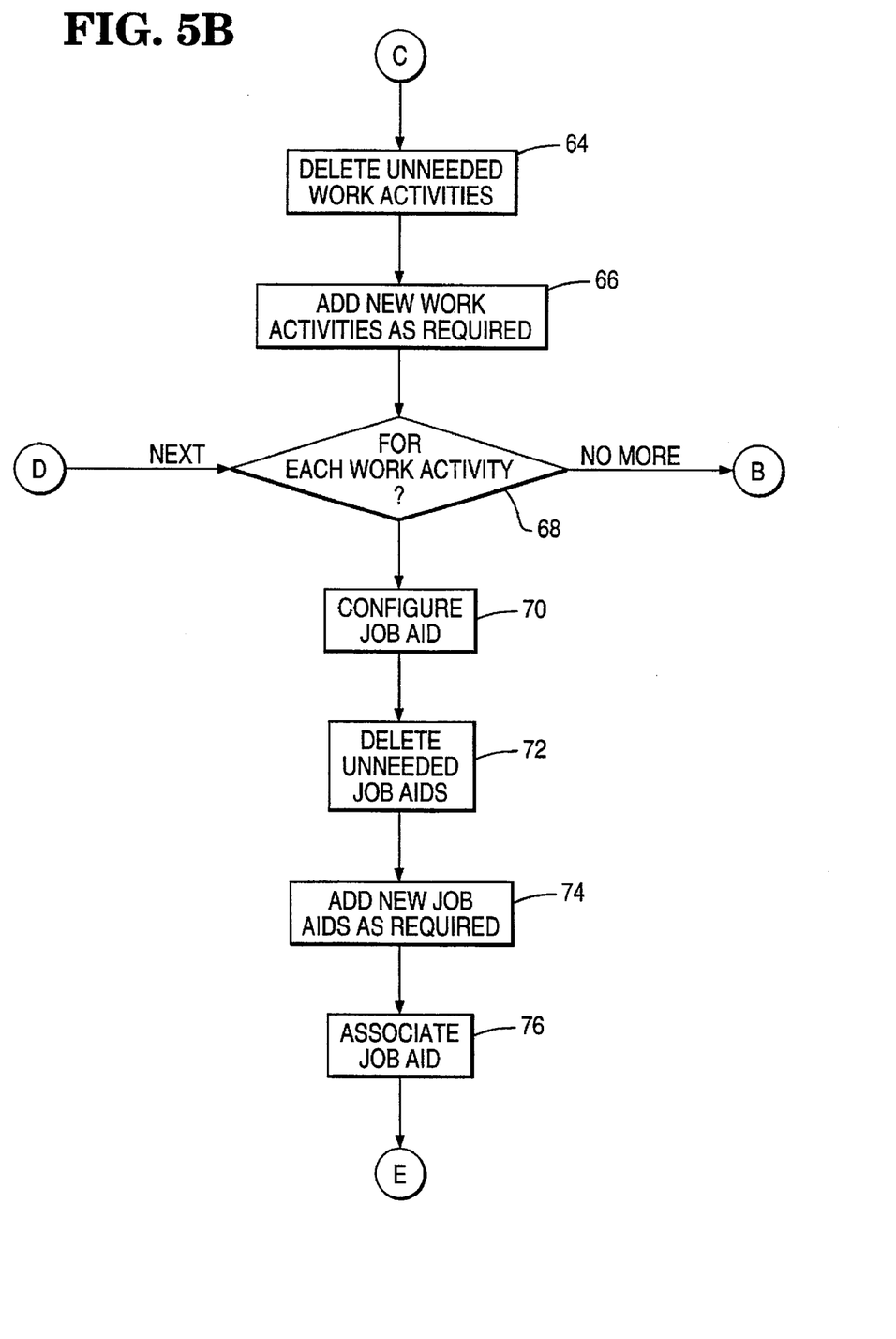
Figure 5C:
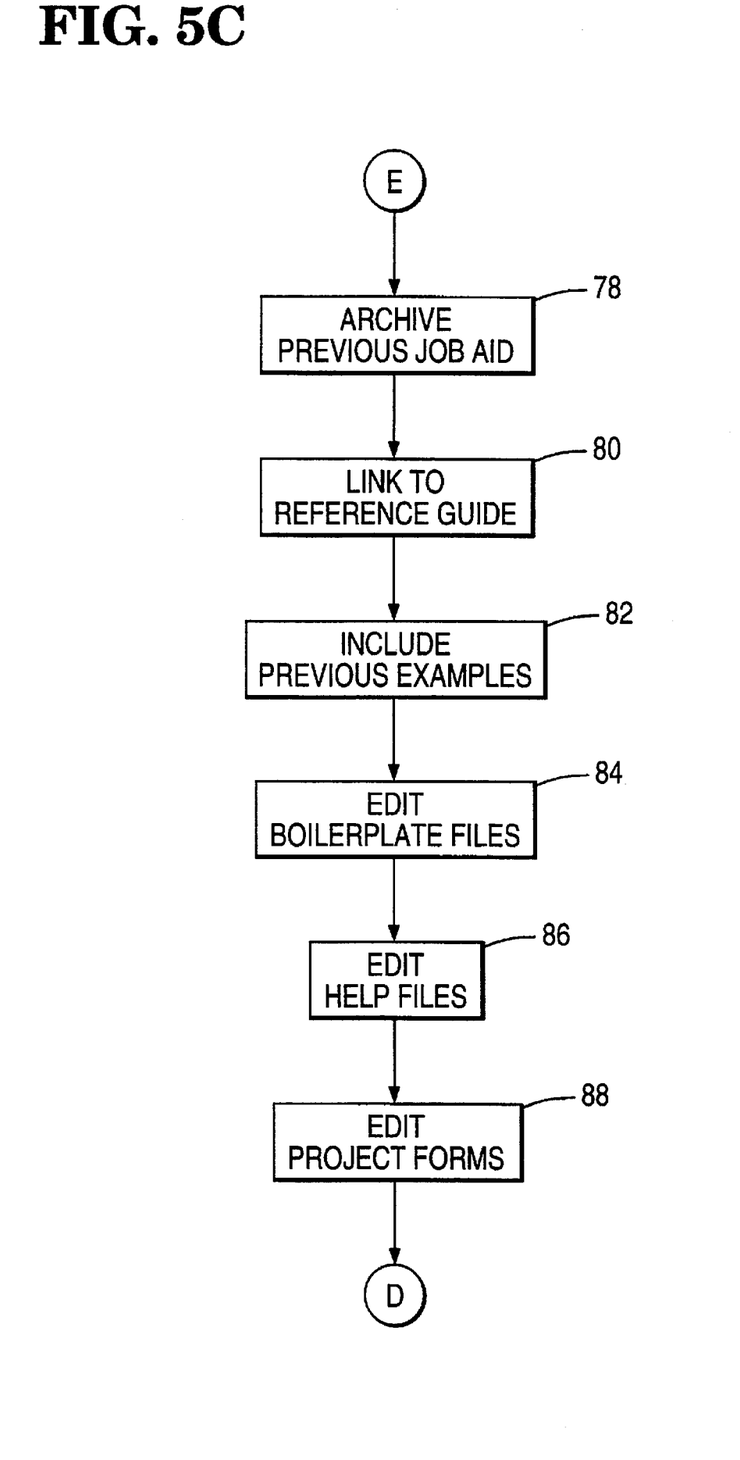

FIGS. 5A, 5B, and 5C together are a flow chart illustrating the steps performed in using the QIPP-PSS 24 to create a project. Block 50 represents an iterative process performed for each project defined in the QIPP-PSS 24. Block 52 represents the configuration of the QIPP-PSS 24 project, which comprises blocks 54, 56, and 58 representing the cloning of an existing project to copy the phases, work activities and job aids from that project, the deletion of unneeded phases, and the adding of new phases. Block 60 represents an iterative process performed for each phase in a project. Block 62 represents the configuration of the work activities in the phase, which comprises blocks 64 and 66 representing the deletion of unneeded work activities and the adding of new work activities as required. Block 68 represents an iterative process performed for each work activity defined in the phase. Block 70 represents the configuration of the job aid, which comprises blocks 72 and 74 representing the deletion of unneeded job aids and the adding of new job aids. Blocks 76-88 represent other optional functions associated with the configuration of each job aid, including associating the job aid with an application and data file, archiving previous or unused job aids, linking the job aid to a topic description in the reference guide, including previously used examples into the job aid, editing boilerplate files, editing help files and editing project forms.

This concludes the description of the preferred embodiment of the invention. In summary, the present invention discloses a computer-implemented "Quality Information Products Process-Performance Support System" (QIPP-PSS) that assists a user through the process of developing a training course or documentation. The QIPP-PSS typically operates on a computer having a monitor and a memory for storing electronic records related to the organization of projects. Each project is divided into one or more phases, each phase is divided into one or more work activities, and each work activity is divided into one or more job aids. The records for the projects, phases, work activities, and job aids include linkages to maintain these relationships. The job aids may comprise a boilerplate file providing reusable information such as templates or forms for a project, a help file explaining how to use the templates of the boilerplate file, linkages to a reference guide explaining the job aid, examples providing models of completed work activities, and project forms for documenting work in progress using the reusable information from the boilerplate file. The QIPP-PSS includes a graphical user interface comprised of a "project folder manager" that controls the interactions between the computer-implemented QIPP-PSS and the user. The project folder manager selectively displays interrelated project, phase, work activity, and job aid records on a monitor, and allows users to configure projects by adding, modifying, and deleting the project, phase, work activity, and job aid records, thereby allowing the user to model any total quality management process.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented electronic performance support system, comprising:
   (a) a computer with a monitor coupled thereto;
   (b) a memory, coupled to the computer, for storing electronic project records, wherein each project record is divided into one or more phase records, each phase record is divided into one or more work activity records, and each work activity record is divided into one or more job aid records, each job aid record being selected from a group comprising a boilerplate file for providing templates for a project record, a help file for explaining how to use the templates, linkages to a reference guide for explaining a job aid record, examples providing models of completed work activity records, and project forms for documenting work in progress using the templates from the boilerplate file; and
   (c) project manager means, performed by the computer and displayed on the monitor, for managing interactions between the computer and a user, wherein the project manager means further comprises means for configuring projects by adding, modifying, and deleting the electronic project records, phase records, work activity records, and job aid records, thereby allowing the user to model any total quality management process.

2. The invention as set forth in claim 1 above, wherein the means for configuring projects comprises:
   (1) means for configuring the phase records of a selected project record, further comprising means for selecting one or more phase records from a set of canned phase records stored in the memory, means for deleting unneeded phase records from the set, and means for adding new phase records to the set as required;
   (2) means for configuring the work activity records of each phase record, further comprising means for selecting one or more work activity records from a set of canned work activity records stored in the memory, means for deleting unneeded work activity records from the set, and means for adding new work activity records to the set as required; and
   (3) means for configuring the job aid records for each work activity record, further comprising means for selecting one or more job aid records from a set of canned job aid records stored in the memory, means for deleting unneeded job aid records from the set, and means for adding new job aid records to the set as required.

3. The invention as set forth in claim 2 above, wherein the means for adding new job aid records further comprises means for associating a function with a data file, and means for specifying the data file's contents.

4. The invention as set forth in claim 1 above, further comprising means for graphically representing the project manager means on the monitor coupled to the computer.

5. The invention as set forth in claim 4 above, wherein the means for graphically representing comprises:
   (1) means for identifying a project record on the monitor; and
   (2) means for displaying the phase records, work activity records, and job aid records on the monitor, wherein relationships between the phase records, work activity records, and job aid records are graphically represented on the monitor.

6. The invention as set forth in claim 1 above, further comprising means for invoking an application and accessing an associated data file for a selected job aid record displayed on the monitor.

7. A computer-implemented electronic performance support system, comprising:
   (a) a computer with a monitor coupled thereto;
   (b) a memory, coupled to the computer, for storing electronic project records, phase records, work activity records, and job aid records, wherein the phase records are linked to the project records, the work activity records are linked to the phase records, and the job aid records are linked to the work activity records; and
   (c) graphical user interface means, performed by the computer and displayed on the monitor, for managing interactions between the computer and a user, wherein the graphical user interface means further comprises means for selectively displaying a project record on the monitor, means for displaying one or more phase records linked to the displayed project record on the monitor, means for selectively displaying one or more work activity records linked to the displayed phase records on the monitor, and means for selectively displaying one or more job aid records linked to the displayed work activity records on the monitor, and means for configuring projects by adding, modifying, and deleting the displayed project, phase, work activity, and job aid records.

8. The invention as set forth in claim 7 above, wherein the graphical user interface means further comprises means for selecting a displayed job aid record, means for invoking a function associated therewith, and means for adding, modifying and deleting a data file associated with the selected job aid record.

9. The invention as set forth in claim 7 above, wherein each job aid record comprises a boilerplate file for containing templates for a project record.

10. The invention as set forth in claim 9 above, wherein the job aid record comprises a help file for explaining how to use the templates.

11. The invention as set forth in claim 7 above, wherein each job aid record comprises a linkage to a reference guide for explaining the job aid record.

12. The invention as set forth in claim 7 above, wherein each job aid record comprises an example providing a model of a completed work activity record.

13. The invention as set forth in claim 7 above, wherein each job aid record comprises a project form for documenting work in progress for a project record.

14. The invention as set forth in claim 7 above, wherein the means for configuring projects comprises:

(1) means for configuring the phase records of a specified project record, further comprising means for selecting one or more of the phase records from a set of canned phase records stored in the memory, means for deleting unneeded phase records from the set, and means for adding new phase records to the set as required;

(2) means for configuring the work activity records of each phase record, further comprising means for selecting one or more work activity records from a set of canned work activity records stored in the memory, means for deleting unneeded work activity records from the set, and means for adding new work activity records to the set as required; and (3) means for configuring the job aid records for each work activity record, further comprising means for selecting one or more job aid records from a set of canned job aid records stored in the memory, means for deleting unneeded job aid records from the set, and means for adding new job aid records to the set as required.

15. The invention as set forth in claim 14 above, wherein the means for configuring job aid records further comprises means for associating a function with a data file related to each job aid record, and means for specifying the data file's contents.

16. A method for implementing a computerized performance support system, comprising:

(a) storing electronic project records in a memory of a computer, wherein each project record is divided into one or more phase records, each phase record is divided into one or more work activity records, and each work activity record is divided into one or more job aid records, each job aid record being selected from a group comprising a boilerplate file for providing templates for a project record, a help file for explaining how to use the templates, linkages to a reference guide for explaining a job aid record, examples providing models of completed work activity records, and project forms for documenting work in progress using the templates from the boilerplate file; and (b) managing interactions between the computer and a user, further comprising the steps of configuring projects by adding, modifying, and deleting the electronic the project records, phase records, work activity records, and job aid records, thereby allowing the user to model any total quality management process.

17. The invention as set forth in claim 16 above, wherein the configuring projects step comprises the steps of:

(1) configuring the phase records of a specified project record, further comprising the steps of selecting one or more phase records from a set of canned phase records stored in the memory, deleting unneeded phase records from the set, and adding new phase records to the set as required;

(2) configuring the work activity records of each phase record, further comprising the steps of selecting one or more work activity records from a set of canned work activity records stored in the memory, deleting unneeded work activity records from the set, and adding new work activity records to the set as required; and (3) configuring the job aid records for each work activity record, further comprising the steps of selecting one or more job aid records from a set of canned job aid records stored in the memory, deleting unneeded job aid records from the set, and adding new job aid records to the set as required.

18. The invention as set forth in claim 17 above, wherein the adding new job aid records step further comprises the steps of associating an applications program for performing various functions with a data file, and specifying the data file's contents.

19. The invention as set forth in claim 17 above, further comprising the step of graphically representing the project manager on the monitor coupled to the computer.

20. The invention as set forth in claim 19 above, wherein the graphically representing step comprises the steps of:

(1) identifying a project record on the monitor; and (2) displaying the phase records, work activity records, and job aid records related to the project record on the monitor, wherein relationships between the phase records, work activity records, and job aid records are graphically represented on the monitor.

* * * * *